US007788205B2

(12) United States Patent  (10) Patent No.: US 7,788,205 B2
Chalasani et al.  (45) Date of Patent: Aug. 31, 2010

(54) USING STOCHASTIC MODELS TO DIAGNOSE AND PREDICT COMPLEX SYSTEM PROBLEMS

(75) Inventors: Nanchariah Raghuveera Chalasani, Fairfax, VA (US); Ajamu A. Wesley, Marlborough, MA (US); Javed Rahman, Medford, MA (US); Balan Subramanian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 11/433,822

(22) Filed: May 12, 2006

(65) Prior Publication Data

US 2007/0265811 A1   Nov. 15, 2007

(51) Int. Cl.
G06F 17/00 (2006.01)
G06N 5/02 (2006.01)
(52) U.S. Cl. .................................................. 706/48
(58) Field of Classification Search ................ 706/24
See application file for complete search history.

(56) References Cited

U.S. PATENT DOCUMENTS 4,649,537 A   3/1987   Rosswurm et al.

(Continued)

FOREIGN PATENT DOCUMENTS

EP   0335507 A2   10/1989

OTHER PUBLICATIONS

Hidden Markov models with duration-dependent state transition probabilities (speech recognition), Vaseghi, S.V.; Electronics Letters vol. 27 , Issue: 8 Digital Object Identifier: 10.1049/el:19910392 Publication Year: 1991 , pp. 625-626.*

(Continued)

*Primary Examiner*—Michael Holmes
(74) *Attorney, Agent, or Firm*—Stephen A. Calogero, Esq.; Steven M. Greenberg, Esq.; Carey Rodriguez Greenberg & Paul, LLP (57) ABSTRACT

A plurality of stochastic models is built that predict the probabilities of state transitions for components in a complex system. The models are trained using output observations from the system at runtime. The overall state and health of the system can be determined at runtime by analyzing the distribution of current component states among the possible states. Subsequent to a low level component failure, the state transition probability stochastic model for the failed component can be analyzed by uncovering the previous states at N time intervals prior to the failure. The resulting state transition path for the component can be analyzed for the causes of the failure. Additionally, component failures resulting from the failure, or worsening state transition, in other components can be diagnosed by uncovering the previous states at the N times prior to the failure for multiple components in the system and then analyzing the state transition paths for correlations to the failed component. Additionally, transitions to worsening states can be predicted using an action matrix. The action matrix is created beforehand using state information and transition probabilities derived from a component's stochastic model. The action matrix is populated probabilities of state transitions at a current state for given actions. At runtime, when an action is requested of a component, the probability of the component transitioning to a worsening state by performing the action can be assessed from the action matrix by using the current state of the component (available from the stochastic model).

20 Claims, 7 Drawing Sheets

U.S. PATENT DOCUMENTS

| | | |
|---|---|---|
| 5,123,017 A | 6/1992 | Simpkins et al. |
| 5,465,321 A | 11/1995 | Smyth |
| 5,922,079 A | 7/1999 | Booth et al. |
| 5,959,969 A | 9/1999 | Croslin et al. |
| 6,141,770 A | 10/2000 | Fuchs et al. |
| 6,353,815 B1 | 3/2002 | Vilim et al. |
| 6,401,226 B1 | 6/2002 | Maeno |
| 6,557,120 B1 | 4/2003 | Nicholson et al. |
| 6,591,146 B1 * | 7/2003 | Pavlovic et al. ............... 700/29 |
| 6,799,162 B1 * | 9/2004 | Goronzy et al. ............. 704/244 |
| 6,801,949 B1 | 10/2004 | Bruck et al. |
| 6,862,697 B1 | 3/2005 | Moran et al. |
| 6,865,591 B1 | 3/2005 | Garg et al. |
| 6,993,462 B1 * | 1/2006 | Pavlovi et al. ................. 703/2 |
| 7,139,688 B2 * | 11/2006 | Aggarwal et al. .............. 703/2 |
| 7,415,359 B2 * | 8/2008 | Hill et al. ...................... 702/19 |
| 7,418,383 B2 * | 8/2008 | Droppo et al. ............. 704/236 |
| 7,424,409 B2 * | 9/2008 | Ben-Gal et al. ................ 703/2 |
| 7,451,207 B2 * | 11/2008 | Oliver ........................ 709/224 |
| 7,561,991 B2 * | 7/2009 | Matsunaga et al. ............. 703/2 |
| 7,590,530 B2 * | 9/2009 | Zhao et al. .................. 704/226 |
| 7,590,589 B2 * | 9/2009 | Hoffberg ..................... 705/37 |
| 7,613,572 B2 * | 11/2009 | Ben-Gal et al. ............... 702/19 |
| 7,648,365 B2 * | 1/2010 | Olsen ......................... 434/219 |
| 2007/0168494 A1 * | 7/2007 | Liu et al. .................... 709/224 |

OTHER PUBLICATIONS

Probability of State Transition Errors in a Finite State Machine Containing Soft Failures, Guang Xing Wang; Redinbo, G.R.; Computers, IEEE Transactions on vol. C-33 , Issue: 3 Digital Object Identifier: 10.1109/TC.1984.1676424 Publication Year: 1984 , pp. 269-277.*

Model-approximated dynamic programming based on decomposable state transition probabilities, Inamoto, T.; Tamaki, H.; Murao, H.; SICE, 2007 Annual Conference Digital Object Identifier: 10.1109/SICE.2007.4421439 Publication Year: 2007 , pp. 2649-2654.*

Isolated word recognition using continuous state transition-probability and DP-matching, Takara, T.; Acoustics, Speech, and Signal Processing, 1989. ICASSP-89., 1989 International Conference on Digital Object Identifier: 10.1109/ICASSP.1989.266418 Publication Year: 1989 , pp. 274-277 vol. 1.*

I. Rish, et al, "*Real-time Problem Determination in Distributive System Using Active Probing*," IEEE Fault Management, Session Three, pp. 133-146 (2004).

* cited by examiner

| C | M | U | P | L |
|---|---|---|---|---|
| 5 | 5 | 1 | 6 | 10ms |
| 20 | 80 | 5 | 40 | 10ms |
| 70 | 70 | 10 | 100 | 10ms |
| 80 | 100 | 8 | 90 | 10ms |
| 60 | 50 | 15 | 100 | 10ms |
| 80 | 100 | 25 | 120 | 10ms |

Output Information Table

| Platform | Operating System | Virtual Machine | Prerequisite Software | Software Level |
|---|---|---|---|---|
| | | | | |

System Characteristics Table

FIG. 4

Sample Action Matrix

| Action | Current State | Next State | Probability |
|---|---|---|---|
| A | Factors | Anomaly | 0.70 |
| A | Factors | Factors | 0.20 |
| A | Factors | Incident | 0.07 |
| A | Factors | Emergency | <0.01 |
| A | Factors | Imminent Catastrophe | <0.01 |
| A | Factors | Failure | <0.01 |
| A | Anomaly | Incident | 0.80 |
| A | Anomaly | Anomaly | 0.15 |
| A | Anomaly | Imminent Catastrophe | 0.02 |
| A | Anomaly | Failure | <0.01 |
| A | Anomaly | Emergency | <0.01 |
| A | Anomaly | Incident | <0.01 |
| A | Incident | Emergency | 0.75 |
| A | Incident | Imminent Catastrophe | 0.18 |
| A | Incident | Failure | 0.04 |
| A | Incident | Factors | <0.01 |
| A | Incident | Anomaly | <0.01 |
| A | Incident | Incident | <0.01 |
| A | Emergency | Imminent Catastrophe | 0.80 |
| A | Emergency | Failure | 0.12 |
| A | Emergency | Emergency | 0.04 |
| A | Emergency | Incident | 0.02 |
| A | Emergency | Anomaly | <0.01 |
| A | Emergency | Factors | <0.01 |
| A | Imminent Catastrophe | Failure | 0.70 |
| A | Imminent Catastrophe | Imminent Catastrophe | 0.23 |
| A | Imminent Catastrophe | Emergency | 0.04 |
| A | Imminent Catastrophe | Anomaly | <0.01 |
| A | Imminent Catastrophe | Incident | <0.01 |
| A | Imminent Catastrophe | Factors | <0.01 |
| B | Emergency | Imminent Catastrophe | 0.93 |
| B | Emergency | Anomaly | 0.03 |
| B | Emergency | Incident | <0.01 |
| B | Emergency | Emergency | <0.01 |
| B | Emergency | Imminent Catastrophe | <0.01 |
| B | Emergency | Failure | <0.01 |
| B | Anomaly | Anomaly | 0.80 |
| B | Anomaly | Incident | 0.10 |
| B | Anomaly | Factors | 0.07 |
| B | Anomaly | Emergency | <0.01 |
| B | Anomaly | Imminent Catastrophe | <0.01 |
| B | Anomaly | Failure | <0.01 |
| B | Incident | Incident | 0.75 |
| B | Incident | Emergency | 0.14 |
| B | Incident | Imminent Catastrophe | 0.08 |
| B | Incident | Failure | <0.01 |
| B | Incident | Factors | <0.01 |
| B | Incident | Anomaly | <0.01 |
| B | Emergency | Emergency | 0.70 |
| B | Emergency | Imminent Catastrophe | 0.20 |
| B | Emergency | Incident | 0.07 |
| B | Emergency | Failure | <0.01 |
| B | Emergency | Anomaly | <0.01 |
| B | Emergency | Factors | <0.01 |
| B | Imminent Catastrophe | Imminent Catastrophe | 0.90 |
| B | Imminent Catastrophe | Failure | 0.05 |
| B | Imminent Catastrophe | Emergency | 0.02 |
| B | Imminent Catastrophe | Anomaly | <0.01 |
| B | Imminent Catastrophe | Incident | <0.01 |
| B | Imminent Catastrophe | Factors | <0.01 |
| C | | Next State | Probability |
| C | | Factors | 0.83 |
| C | | Anomaly | 0.11 |
| C | | Incident | 0.03 |
| C | | Emergency | <0.01 |
| C | | Imminent Catastrophe | <0.01 |
| C | | Failure | <0.01 |
| C | | Anomaly | 0.75 |
| C | | Incident | 0.10 |
| C | | Factors | 0.08 |
| C | | Emergency | 0.05 |
| C | | Imminent Catastrophe | <0.01 |
| C | | Failure | <0.01 |
| C | | Incident | 0.85 |
| C | | Emergency | 0.09 |
| C | | Imminent Catastrophe | 0.03 |
| C | | Failure | <0.01 |
| C | | Anomaly | <0.01 |
| C | | Factors | <0.01 |
| C | | Emergency | 0.75 |
| C | | Imminent Catastrophe | 0.21 |
| C | | Failure | <0.01 |
| C | | Anomaly | <0.01 |
| C | | Incident | <0.01 |
| C | | Factors | <0.01 |
| C | Emergency | Imminent Catastrophe | 0.70 |
| C | | Emergency | 0.21 |
| C | | Failure | 0.06 |
| C | | Anomaly | <0.01 |
| C | | Incident | <0.01 |
| C | | Factors | <0.01 |

Diagnosing Failures by State Transitions/Concurrent Training

USING STOCHASTIC MODELS TO DIAGNOSE AND PREDICT COMPLEX SYSTEM PROBLEMS

BACKGROUND OF THE INVENTION

The present invention relates to using stochastic models for diagnosing problems in complex systems and predicting a future worsening state transition.

Within the past two decades the development of raw computing power coupled with the proliferation of computer devices has grown at exponential rates. This growth along with the advent of the Internet have led to a new age of accessibility—to other people, other systems, and to information. This boom has also led to some complexity in the systems. The simultaneous explosion of information and integration of technology into everyday life has brought on new demands for how people manage and maintain computer systems.

Systems today are highly complex comprising of numerous components (servers, virtual machines, CPUs) from different vendors operating in a geographically distributed environment. A clustered Enterprise Application Server environment, Pervasive Computing environment are some examples of such complex systems. Also, these systems are dynamic, where new components can join to provide additional functions while the entire system is running. Conversely, components of the system can leave at runtime.

Additionally, the complexity of these systems and the way they work together has and will create a shortage of skilled IT workers to manage all of the systems. The problem is expected to increase exponentially, just as the dependence on technology has. As access to information becomes omnipresent through PC's, hand-held and wireless devices, the stability of current infrastructure, systems, and data is at an increasingly greater risk to suffer outages and general disrepair One new model of computing, termed "autonomic computing," shifts the fundamental definition of the technology age from one of computing, to that defined by data. The term "autonomic" comes from an analogy to the autonomic central nervous system in the human body, which adjusts to many situations automatically without any external help. Similarly, the way to handle the problem of managing a complex IT infrastructure is to create computer systems and software that can respond to changes in the IT (and ultimately, the business) environment, so the systems can adapt, heal, and protect themselves. In an autonomic environment, components work together communicating with each other and with high-level management tools. They can manage or control themselves and each other.

Self healing technologies are one of the pillars of autonomic computing and on demand. Self-healing requires detecting problematic operations (either proactively through predictions or otherwise) and then initiating corrective action without disrupting system applications. The first step toward this direction is problem determination. Self-healing systems are typically rule driven. Rules define what the system should do to diagnose and correct a problem. However, most problem determination and mitigation solutions today assume that the system is entirely deterministic and hence use automation to fix problems based on rules developed at design time.

Traditionally, problems in complex systems are diagnosed by gathering and then inspecting log and/or trace files. The log/trace files contain raw data that is analyzed to extract meaning. However, these log/trace files do not have a way to capture any particular variations of a components behavior. Therefore, in a traditional diagnostic process, the rules are modified and/or components re-instrumented to accommodate the behavior variations.

BRIEF SUMMARY OF THE INVENTION

The present invention is directed generally to using stochastic models to assess the state information for a component running is a complex system. Initially at least one stochastic model for determining a probability of a state transition between possible states is built for each of a plurality of components in the system. Output data from the system is obtained, with at least some of the output data being relevant to state transitions for at least some of the plurality of components in the system. Each stochastic model for the plurality of components is train with output data that is relevant for a respective component. Information about states the plurality of components in the system is derived from the corresponding stochastic model for the respective components. Finally, the state of the system can be determined from the distribution of the states for components.

An initial stochastic model for determining a probability of state transitions for a component is built by determining the possible internal states of the component and then determining output data from the system that is relevant to state transitions for the component and creating the initial model. Training data for the stochastic model is obtained from system outputs and used to train the initial stochastic model.

A matrix of state transition probabilities by action is assembled from probabilities of state transitions between possible states of the component resulting from the component processing the action. Action requests for a component are received as well as action response output data from the system in response to the component processing the plurality of actions. The stochastic model for the component is trained with the action response output data and the probabilities of state transitions between possible states of the component are determined from the stochastic mode. The action matrix is populated with correlations between the probabilities of a state transition between possible states of the component and the current state of the component for a specific action. The action matrix is stored and used a runtime to predict whether a component processing an action in its current state might result in the component transitioning into a worsening state before the component can process the action.

BRIEF DESCRIPTION OF THE SEVERAL VIEWS OF THE DRAWINGS

The novel features believed characteristic of the present invention are set forth in the appended claims. The invention, will be best understood by reference to the following description of an illustrative embodiment when read in conjunction with the accompanying drawings wherein:

Other features of the present invention will be apparent from the accompanying drawings and from the following detailed description.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Moreover, the computer readable medium may include a carrier wave or a carrier signal as may be transmitted by a computer server including internets, extranets, intranets, world wide web, ftp location or other services that may broadcast, unicast or otherwise communicate an embodiment of the present invention. The various embodiments of the present invention may be stored together or distributed, either spatially or temporally across one or more devices.

Computer program code for carrying out operations of the present invention may be written in an object oriented programming language such as Java, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The present invention relates to monitoring and diagnosing problems in complex systems. More specifically, the present invention describes methods by which stochastic modeling can be used to diagnose large complex systems with many components. And in particular, the present invention provides a detailed description of how stochastic models (such as hidden Markov models) can be used to build a model of a complex enterprise software system from the output it generates. Those models can subsequently be utilized to monitor the systems state, predict problems before they occur and diagnose any problems in the system that do occur.

One immediate problem facing developers with the current problem determination (PD) systems is the need for incrementing the components involved to participate in the problem determination activity. This is not always possible, particularly when the system comprises of numerous components from different vendors. The problem is particularly felt in Service Oriented Architectures (SOAs) where the actual components are hidden behind service interfaces and hence not accessible to instrumentation. Also, current PD systems require a set of rules that describe how to detect a failure. These rules have to be created by a human before the system can do any problem determination. Another primary problem is that failures are usually detected at the system level and then a response is devised. It is desirable to have the system detect component failures that lead to system catastrophe and take preventive action. However, it is very difficult to predict if a low-level component failure will indeed lead to an overall system failure.

Most problem determination and mitigation solutions today assume that the system is entirely deterministic and hence use automation to fix problems based on rules developed at design time. It is however highly beneficial to have a system that is autonomic and can actually discover the relationships between low level failures and system catastrophes.

Systems today are highly complex comprising of numerous components (servers, virtual machines, CPUs) from different vendors operating in a geographically distributed environment. Some typical examples of complex systems include clustered enterprise application server (EAS) environments and pervasive computing environments. One characteristic of these systems that makes accurate rules-based PD activity difficult is that the systems are dynamic, i.e., new components can join the system to provide additional functions while the entire system is running and components of the system can leave at runtime.

Figure 1:
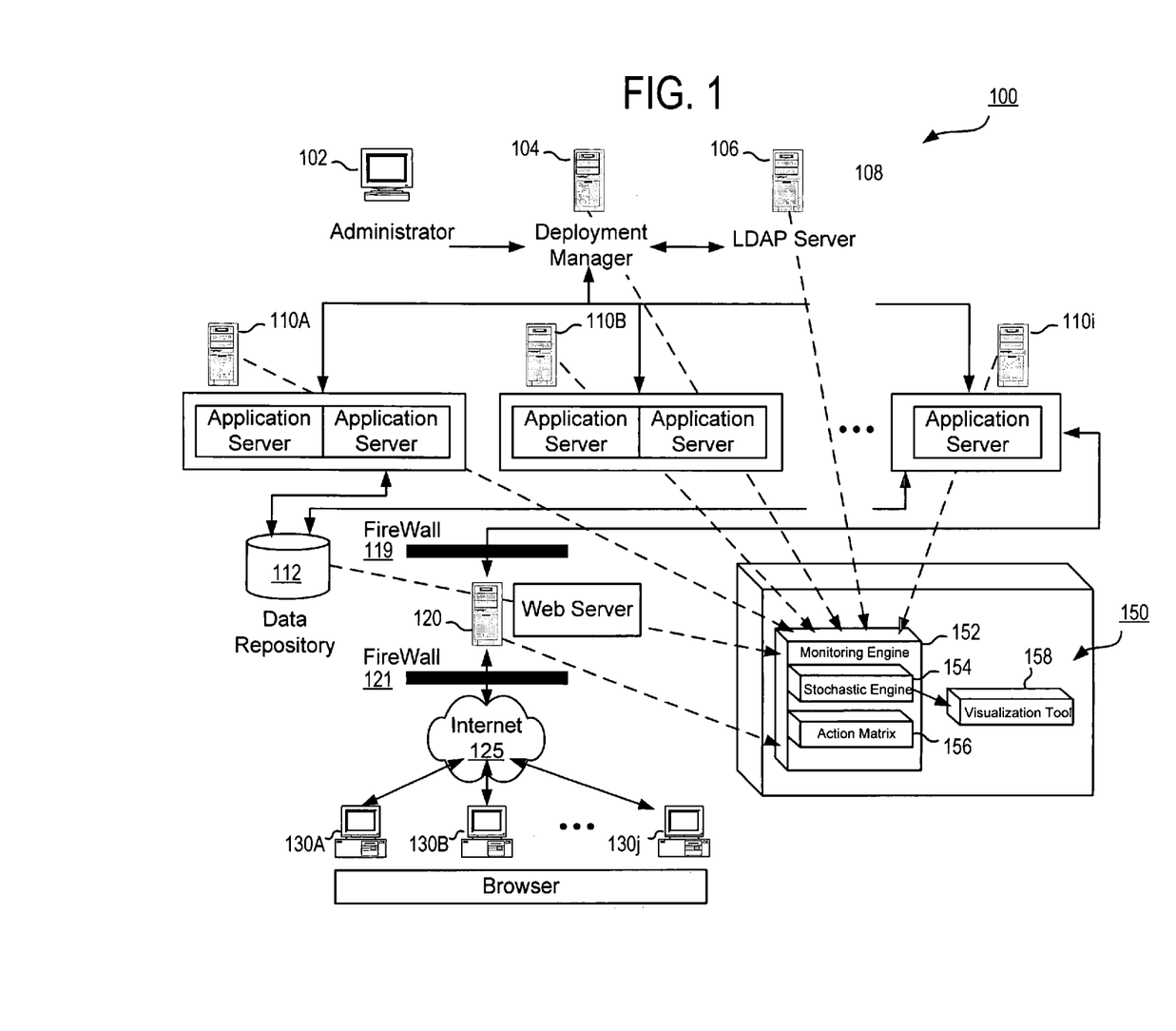
FIG. 1 is a diagram of an complex system and showing logical connections to a monitoring engine and the interrelationships between the monitoring engine and the stochastic engine in accordance with an exemplary embodiment of the present invention.

FIG. 1 is a diagram of a complex system in which the present invention may be deployed. In an effort to support a plurality of user machines 130A-j, each is connected to a node in a complex system distributed across a wide geographic area. Complex systems have evolved that utilizes resources from different owners and which are often physically located in different geographic areas, as well as in different time zones, such as depicted in distributed enterprise software system 100. According to the diagram, this exemplary system includes multiple service layers which are supported by various service providers. At the top layer, administrator 102 controls the deployment of any of a variety of new system resources/components using a deployment manager 104 (or deletes from) which in turn lists the resource on a multi-dimensional directory, such as LDAP 106 (Lightweight Directory Access Protocol). The directory enables clients 130A-130j to locate organizations, individuals, and other resources, whether on Internet 125 or on a corporate intranet. The next tier of complex system 100 includes physical server 110A-110i, which may be physically deployed hundreds or thousands of miles from administrator 102, and may also be owned by someone other than the administrator, i.e., a third party resource. As such, administrator 102 has the flexibility to choose a physical server, such as servers 110A-110i, and the respective location for deploying components. Multiple components may be deployed on a single server, such as that depicted on servers 110A and 110B wherein two application server components are depicted on each server. Other system resources may also be deployed in support of servers 110A-110i, and ultimately clients 130A-130j, such as data repository 112, for supporting components running on servers 110A and 110i, and web server 120 that is responsible for accepting HTTP requests from browsers running on clients 130A-130j and serving them web pages or other HTML documents. Firewalls 119 and 121 may also be provided for isolating web server 120 from servers 110A-110i and clients 130A-130j.

Traditionally, problems that develop in a complex system such as a system 100 are diagnosed by gathering and then inspecting log/trace files that contain event data. That data is then analyzed to extract meaning about the problem. Typically, however, this data does not indicate particular variations of a components behavior. Therefore, in a traditional diagnostic process, the rules are modified and/or components re-instrumented to accommodate the behavior variations.

In contrast, and accordance with one exemplary embodiment of the present invention, a stochastic model is built from the observations (log/trace files and runtime output information) generated by components deployed in a complex system and subsequently that model is utilized to monitor the system (to prevent problems) and diagnose the system when a problem does occur.

Conceptually, a complex system (and its components) can be thought of as making numerous state transitions at runtime. Some of these transitions will put the system in states where failure is likely. But the state transitions of a complex system and state transitions of its components are not observable, in other words a system is like a black box and only the output the system generates are observable. Hidden Markov Modeling is very useful for these types of problems. By collecting a sizable set of observations, models are built that mimic certain aspects of the operation of the system and the associated state transitions. These models are then applied to a system being monitored or diagnosed. Furthermore, the stochastic models are updated in real time with observations from the system being monitored to evolve with that system. For example, suppose a model was built for an application server running on a single CPU server. If additional CPU capacity is added to the server, the output generated from the server will change. If a static rule is used to locate problems then the PD rule becomes obsolete due to the configuration change. However, because the stochastic model is constantly updated from the output of the server, the model reflects the actual component and it accurately represents transition information for the application server, even though the characteristics of the physical server have changed.

Returning to FIG. 1, various components of distributed enterprise software system 100 are connected to stochastic and monitoring mechanism 150 of the present invention. These components generate outputs that stochastic engine 154 uses to first build the models and then uses the output and the models to prevent problems and diagnose problem when they do occur. Monitoring engine 152 receives that outputs from system components in near real time and passes the information on to stochastic engine 154, which trains the models. Stochastic and monitoring engines 152 utilize these models, along with the action requests to the components, for diagnosing component failures and predicting worsening state transitions that may result in a component to fail in the future. Information uncovered from the models can be used directly by visualization tool 158 for viewing component event data in a time domain. In accordance with one exemplary embodiment of the present invention, indirect causes of a component failure (or worsening state transition) may be diagnosed using the model information by uncovering event transitions for components related to the failed component. It may be appreciated that when a component fails, that failure could be the result of another component's failure (or state transition). Having the ability to uncover state transitions of related components may aid in a better understanding of the original component failure. State transitions for all related components that led to the failure can be uncovered by stochastic engine 154, and visualized optimally for finding related failure causes using visualization tool 158, rather than merely analyzing log data for correlations to the failure event, as practiced in the prior art.

Figure 4:
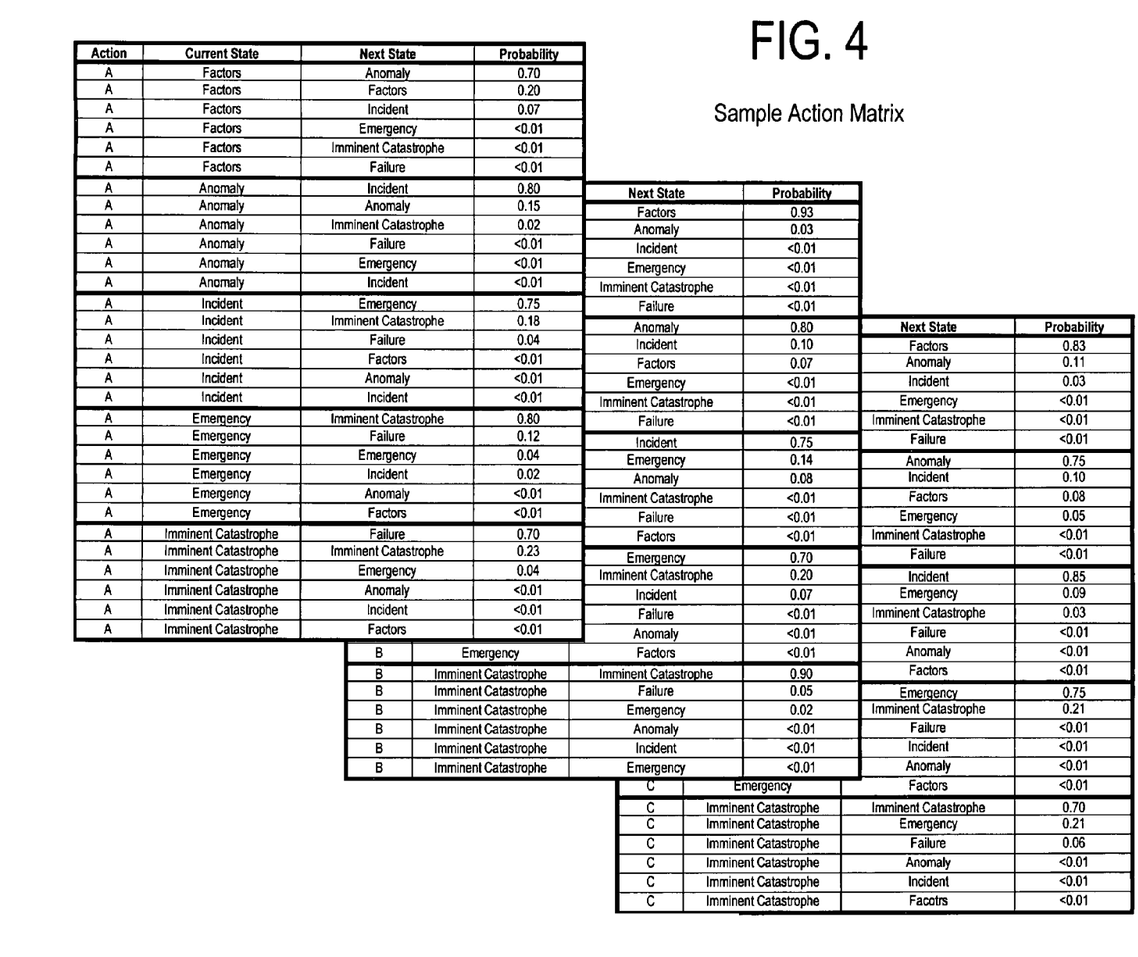
FIG. 4 is an action matrix constructed using probabilities derived from a stochastic model of a system component for given actions in accordance with an exemplary embodiment of the present invention.

In accordance with another exemplary embodiment of the present invention, component failure (or worsening state transitions) may be predicted for a requested action at runtime using the current component state information and action matrix 156 created from the model information for the component. If the result of the action matrix indicates that the component will probably transition into a worsening state, the action can be rejected prior the component failing.

Figure 3:
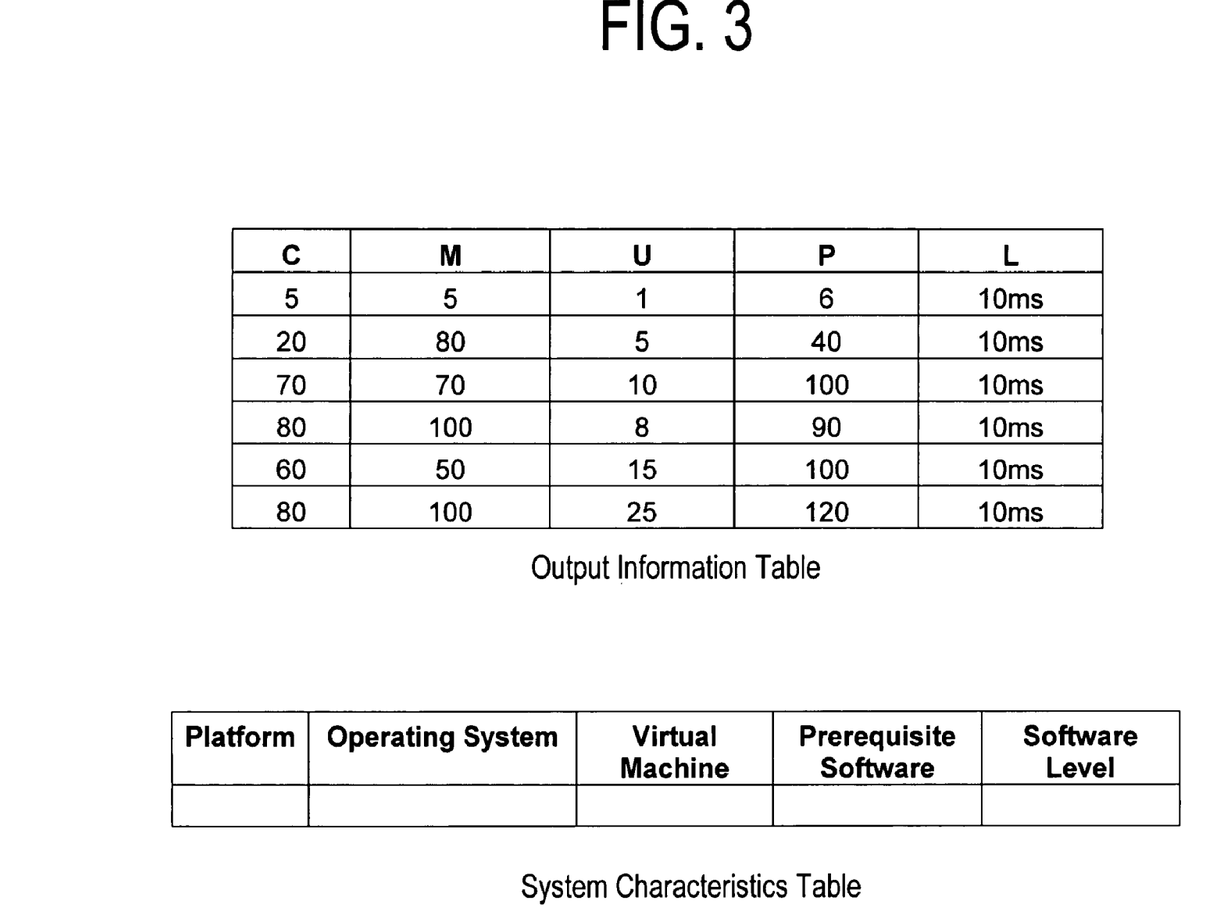
FIG. 3 is an exemplary output information table depicting output information, obtained over time, that is relevant to a particular component, and which is used for building and training a stochastic model for the component in accordance with an exemplary embodiment of the present invention.

According to the present invention, one of more stochastic model is built for each component running in a complex system that accurately reflects state transitions for the respective components. Initially, some information should be known about a component for creating an initial model, such as the system characteristics in which the component is deployed, i.e., the platform, operating system, virtual machine, prerequisite software, software level. Also, as the output data are not state transition data, the output data will be segmented into meaningful discrete states. Like any system using a stochastic model heuristics is involved here to create the initial model, such as designating the number for discrete states for a component. For instance, one component type may transition between four discrete states, resulting in a four state mode model, while another may transition between five discrete states, resulting in a five state mode model. This information is typically supplied by someone with an expert knowledge of the state operations of the component. Furthermore, more than one stochastic model may be built for any system component, for example, a particular component having a four state mode model and another mode model for six internal component states. This information is typically supplied by someone with an expert knowledge of the state operations of the component. Furthermore, more than one stochastic model may be built for any system component, for example, a particular component having a four state mode model and another mode model for six internal component states. Finally, the information collected from the system component should be relevant for the state model. For example, CPU usage (C), Memory usage (M), User logged in (U), Processes running (P), Latency (L), Transactions (T) (see Output Information Table on FIG. 3). In addition, other information is collected about the system, such as the platform, operating system, virtual machine, prerequisite software and software level (see System Characteristics Table on FIG. 3). The relevant data are collected at some meaningful interval or when some threshold is crossed, such as the number of running processes increases/decreases over a threshold number. It should be remembered that since the components are geographically dispersed across various time-zones, all collected output data should be referenced to a standard time.

Figure 2:
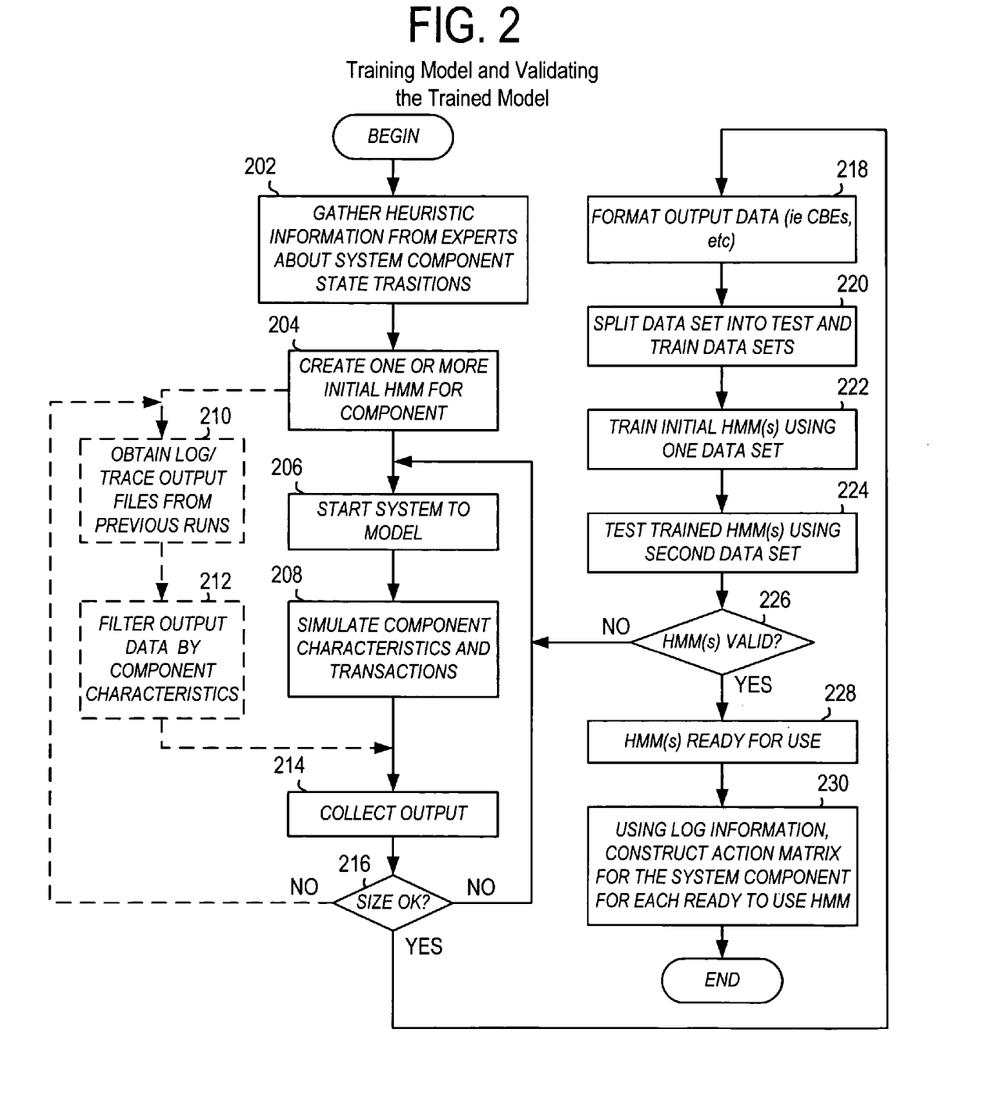
FIG. 2 is a flowchart depicting a method for building stochastic model.

FIG. 2 is a flowchart depicting a method for building stochastic model ($\lambda_i$), where i=1, N in accordance with an exemplary embodiment of the present invention. The process begins by gathering heuristic information from experts related to component state transitions (step 202). As mentioned above, this information includes the number of discrete states to be modeled and the type of data that is relevant to the component state transitions. Using this information, N initial models are created, where N may relate to the number of different state transition modes for the component (step 204).

Next, output data are acquired that is relevant to the component model. This data may be derived from either or both of two sources. The first is by simulating loading of a complex system in which the component is deployed and the second is from actual log or trace files generated by a similar component. In the first case, a complex system is started (step 206) and stressed by applying a simulated transaction load (step 208) and the output information is collected (step 214). After running the system, the generated output will appear similar to that in Output Information Table on FIG. 3. In the second case, trace and log files from a complex system are obtained from previous, but recent runs (step 210). Any data that does not relate to the component being modeled is filtered (step 212), such as by the characteristics of the component. That output information is collected, either separately or combined with the synthetic output information (step 214). Again, the output data will be similar in appearance to the data in Output Information Table. Building an accurate model requires a sufficient amount of information for modeling, thus the size is tested (step 216), if the amount is sufficient the process continues, if not the process reverts to one or both of steps 206 and 210 for acquiring more output data.

Next, if necessary, the output data are formatted into a standard event format, such as CBE (Common Base Events) or WEF ((WSDM) Web Services Distributed Management Event Format) (step 218). This step is optional if the output data are preformatted. The corpus of formatted output data is then split into two data sets, a first set to be used for training the model and a second set to be used to test the trained model (step 220). The initial stochastic model is trained using the first data set (step 222). The trained model is then tested with the second set of data (step 224). Training and evaluating HMMs in this way is well known in the relevant technology using various types of training and evaluation algorithms. As will be readily apparent to those skilled in the relevant art, training is "The Learning Problem" of HMM and utilizes, for instance, the Baum-Welch Algorithm. Once trained the HMM model is evaluated, that is "The Evaluation Problem" of HMM, and which uses, for example, the "Forward Algorithm."

If none of the models $\lambda_i$ validate with the second data set, the process returns to either or both of steps 206 and 210 to acquire more output data for the models (step 226). If at least one of models $\lambda_i$ validate, that model is ready for use (step 228). Optimally, the process described above is repeated numerous times using different component characteristics and a library of stochastic models are built for use in the future.

The final step is to then construct an action matrix for the components in the system (step 230). An action matrix defines the probability of a state transition in response to any possible action requested of the component, given the current state of the component (see the Action Matrix on FIG. 4). Thus, the matrix contains a plurality of current state entries for each possible action and the associate transition state probability for each action/state combination. For the purpose of monitoring a live system and being able to warn of impending failures, the stochastic engine will need to know what state a system is currently operating in, and what action is pending, or being contemplated. From that information, the stochastic engine can calculate the probability of a transition for the given action. The action matrix can be built in advance and populated with all state probability information for every possible action/state combination. During runtime, the action matrix can be updated in real time with new probability information from the stochastic engine, if appropriate, in response to the monitoring engine receiving new output data. Using the action matrix, the probability of a state transition can be determined without the component having to perform a requested action. When a component is requested to perform an action, the probability of that action causing a state transition can be derived from the action matrix by finding the requested action and the current state of the component. In the exemplary action matrix depicted in FIG. 4, all transition probabilities associated with an action are listed in descending order of likelihood for every possible current component state. Using the action matrix, the system can efficiently determine when a pending action will cause a component to transition to a worsening state, and then take corrective action, such as deleting the requested action before it can be processed by the component, notify/log messages for operators, or both.

In order to accurately diagnose a failure, the state transitions that led to the failure should be uncovered. However, when a component fails, the failure could be the result of another component's failure. Therefore, in order to accurately diagnose the failure, the state transitions of related components in the system should also be uncovered.

From the observation, $O=O_1, O_2, \ldots O_T$ and the model, $\lambda$, the last M internal state transitions before a failure can be identified. Hidden Markov model provides Viterbi Algorithm to uncover the transitions of a model. "I" is a set of internal states, so the inquiry is what $I=<I_1, I_2, \ldots I_T>$ is most likely to produce "O". In other words, find "I" that will maximize $P(O,I|\lambda)$ for the model. This concept may be better understood from an explanation of FIGS. 5 and 6.

Figure 5:
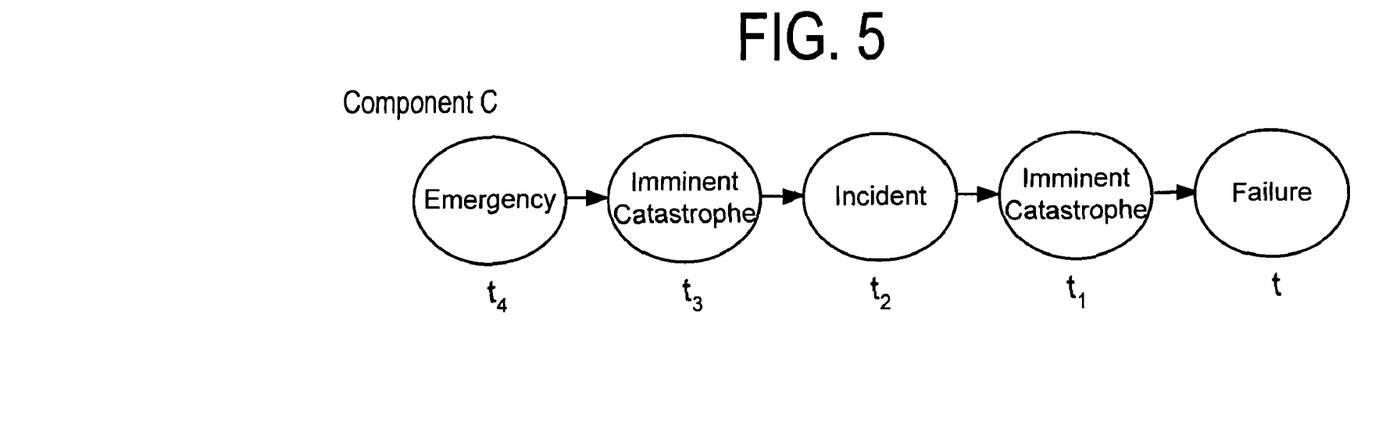
FIG. 5 is a diagram of a state transition path uncovered for a system component in accordance with an exemplary embodiment of the present invention.

FIG. 5 is a diagram of a state transition path uncovered for a system component. More particularly, FIG. 5 is a diagram depicting uncovering transitions of component C. From the diagram, it can be seen that component C failed at time t. By applying an uncovering algorithm, a transition path of the previous N (N=4) transitions are found for failed components C. Immediately prior to the component failing, at time $t_1$, the component was in imminent catastrophe state, which was proceeded by incident state at time $t_2$, imminent catastrophe at time $t_3$, and emergency at time $t_4$. Chronologically, component C transitioned from emergency state to a worsened state of imminent catastrophe, then back to incident and then component C transitioned the worsened state of imminent catastrophe, after which the component failed. This single state transition path does not provide much useful transition information above component C for predicting a failure, except that the failure transitioned from an imminent catastrophe state. However, at early time $t_3$, component C transitioned from imminent catastrophe to the improved incident state. Thus, the single path diagnosis is not particularly used for diagnosing the root of the failure. One possible reason for the poor diagnosis may stem from the cause of the failure not being represented in the state transition path for a single component.

Component C's failure may have been precipitated by a failure, or worsening state transition, in another part of the system. Uncovering the transition path of several components in the system may reveal that a component's failure was the result of another component's state transition. It should be remembered that these correlations are derived from outputs generated by components that may be deployed in geographically disparate regions or the system time of each component may not be completely accurate, therefore, the monitoring engine should tag all of the components' outputs using a universal time stamp.

Figure 6:
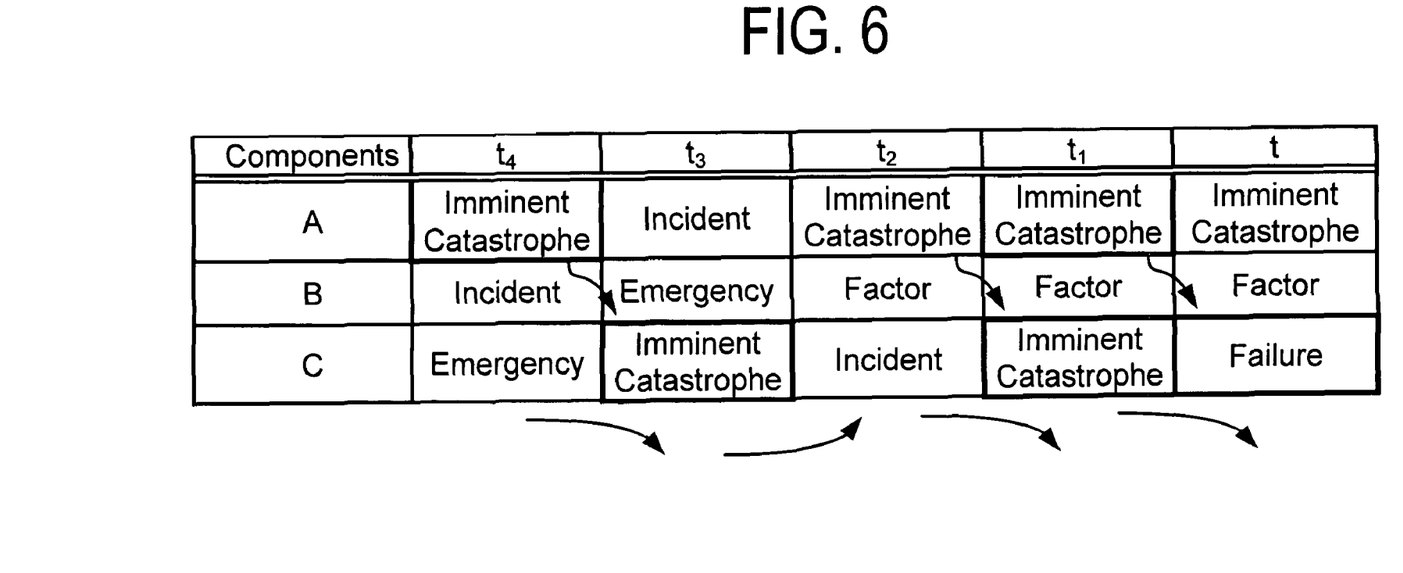
FIG. 6 is a diagram of uncovered state transition paths for various system components accordance with an exemplary embodiment of the present invention.

Uncovering the paths to discover correlations between the transition states of different components is represented diagrammatically in FIG. 6. Notice that the transition state path uncovered for component C is identical to that depicted in FIG. 5. Depicted beside the transition path of component C is the transition path for component B, illustrated between times t and $t_4$. A comparison of the transition paths for component C and component B does not reveal any significant relationship between the worsening states of component C and the state transitions of component B. On the other hand, when the transition path of component C is compared with the transition path of component A, a clear relationship can be seen between the states of component A and component C. At each time that the state of component A is in imminent catastrophe, component C transitions into a worsened state. Thus, transitions of component A effects the state of component C, that is, component B transitioning into an imminent catastrophe state is a precursor to a worsening state transition for component C.

With this diagnostic information, the administrator for the system may remedy failures of component C by reconfiguring or redeploying component B.

Figure 7:
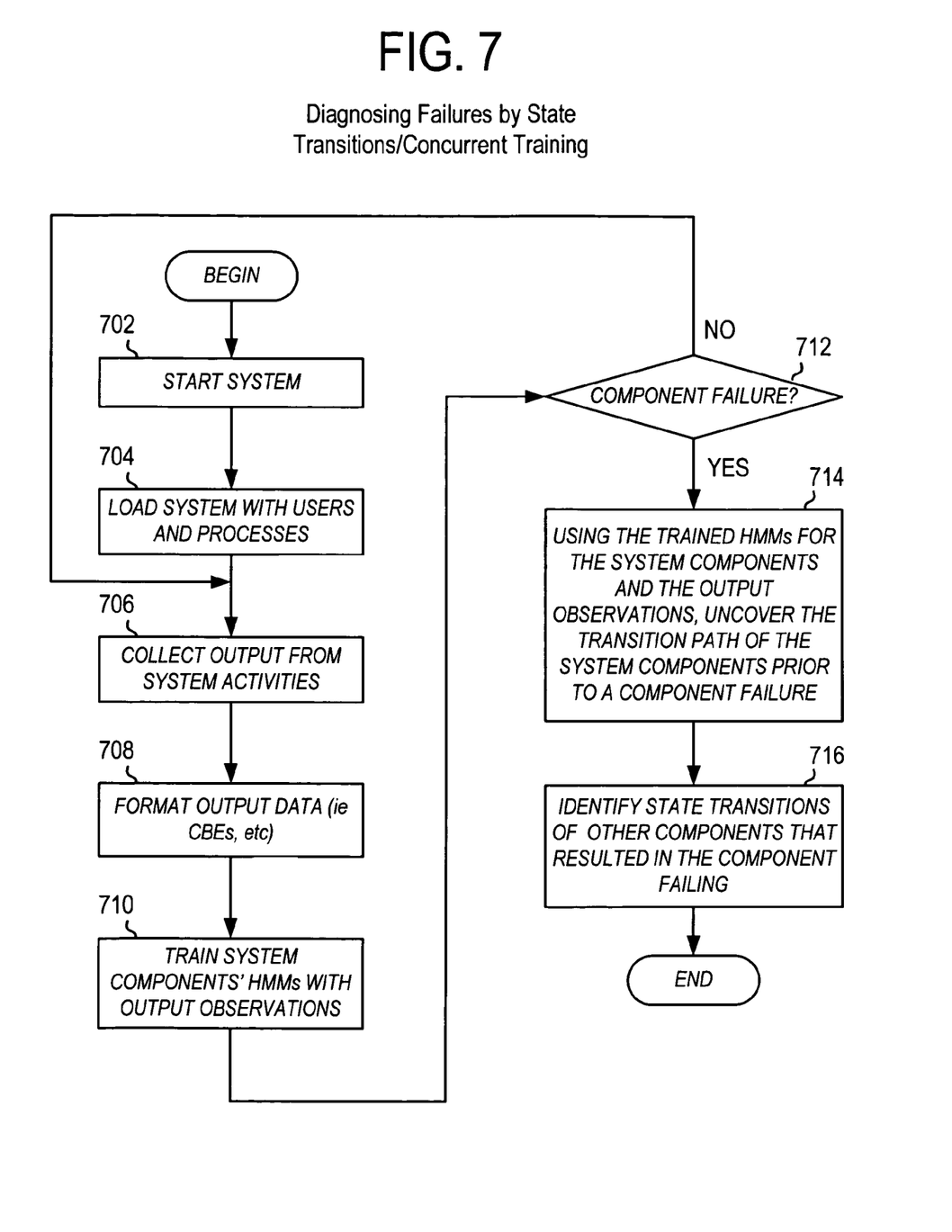
FIG. 7 is a flowchart depicting a method for diagnosing component failures in a complex system using stochastic models of the components in accordance with an exemplary embodiment of the present invention.

FIG. 7 is a flowchart depicting a method for diagnosing component failures in a complex system using stochastic models of the components in accordance with an exemplary embodiment of the present invention. Prior to the process beginning, an appropriate model(s), $\lambda_i$ is selected for each of the system components based on the characteristics of the respective component. As mentioned above, a library of models may be built beforehand and the model that most closely resembles the characteristics of the component to be monitored is selected. With the models selected for the stochastic engine, corresponding to components in the system to be monitored, the system is started (step 702) and loaded with users and processes (step 704), that is, in runtime. The monitoring engine collects output information that is relevant for each component (step 706) and the data is formatted for use with the stochastic engine, if not already formatted (step 708). Finally, the output information is passed to the stochastic engine which trains the individual models at runtime (step 710).

The previously described steps represent a dynamic, but stable, runtime for system. If the components continue to operate without a failure, the process iterates through steps 706 and 712 and the models are dynamically trained with relevant output data received by the monitor (step 712). In the event of a component failure, the transition path prior to the component failure can be uncovered (step 714). Using the transitions paths for the multiple system components, any precursor transition states that relate to the failure can be identified (step 716). Furthermore, because the diagnosis makes use of transitions paths for multiple system components, from the corresponding models, even precursor transition states on other components that relate to the failure can be identified.

In accordance with another exemplary embodiment of the present invention, these stochastic models can be employed to analyze the overall state of the system at runtime. A unified model for the entire system cannot be built because the configuration topology is unknown and/or will change at runtime. By definition a complex system will have multiple components. However, it is possible to monitor such a system using the stochastic models for the system components. As loads shift, or components are frequently deployed, re-deployed and taken out of service, the stochastic engine dynamically trains the stochastic models for changes in the system, without having to know anything about the complex system the component is deployed. Therefore, and in accordance with another exemplary embodiment of the present invention, a snapshot view of the state of the overall system can be obtained at anytime by looking at the distribution of components among states (derived from the updated stochastic models).

Figure 8:
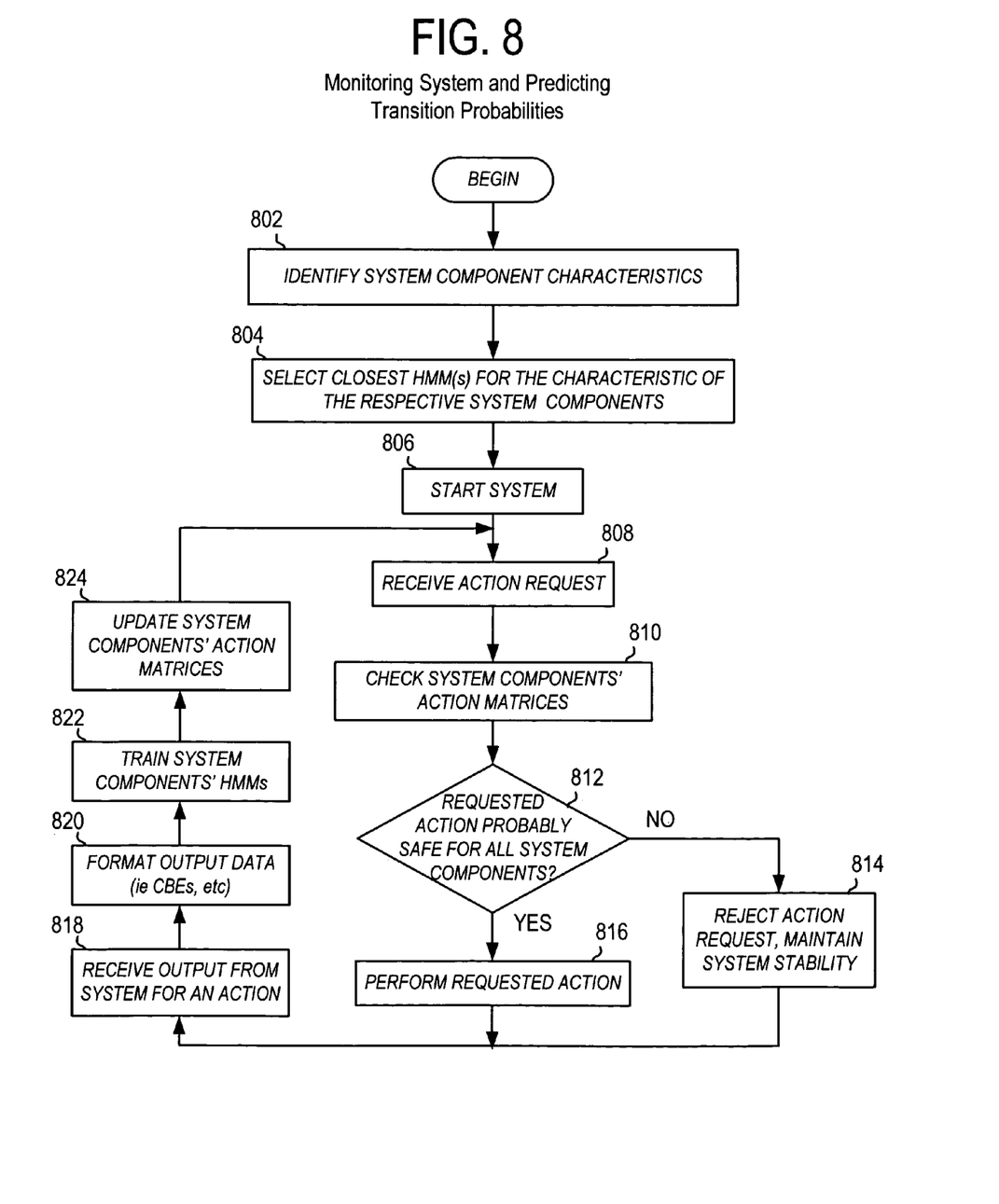
FIG. 8 is a flowchart depicting a method for monitoring a system in real time and predicting state transition probabilities that might cause component failures in accordance with an exemplary embodiment of the present invention.

FIG. 8 is a flowchart depicting a method for monitoring a system in real time and predicting state transition probabilities that might cause component failures in accordance with an exemplary embodiment of the present invention. The process begins by identifying system component characteristics (step 802) and from those characteristics, selecting stochastic models that closely resemble the components' characteristics from, for instance, a library of models (step 804). The system is then started (step 806). It should be understood that at predetermined time intervals or in response to predefined events, the monitoring engine will receive output information from the system's components. These will be received regardless of whether or not an action is requested of a particular component. However, once an action request is received by the monitoring engine (step 808), the system components' action matrices are checked for the probability of a state transition given the current state of the respective components (step 810). If the requested action is safe, that is, if by performing the requested action the system components will not transition into a worsening state, or transition into a state below some predetermined threshold, the requested action is performed (step 816). The monitoring engine then receives output information from the system's components in response to the action (step 818), which is formatted, if necessary (step 820) and used by the stochastic engine to train the component models (step 822). The updated transition probabilities are used to update the action matrices for the components (step 824).

Returning to step 812, if it is determined from the action matrix that performing the requested action may not be safe for the system components, preventative measures may be taken to avoid a component failure (step 814). These measures may include canceling the requested action before it can be processed by the component, notify/log messages for operators, or both. The monitoring engine then receives output information from the system's components, but in response to the preventative measures taken (step 818). That data are formatted, if necessary (step 820) and used by the stochastic engine to train the component models (step 822). Finally, the updated transition probabilities are used to update the action matrices for the components as before (step 824).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-implemented method for using stochastic models to assess component state information comprising:
   building at least one stochastic model for determining a probability of a state transition between possible states for each of a plurality of components in a system;
   receiving output data from the system, at least some of the output data being relevant to state transitions for at least some of the plurality of components in the system;
   training each stochastic model for the plurality of components in a system with output data that is relevant for a respective component;
   determining states of the plurality of components in the system from the at least one stochastic model; and
   determining a state of the system from a distribution of the states for the plurality of components among the possible states.

2. A computer usable tangible medium having computer readable instructions embodied therewith for using stochastic models to assess component state information, the computer readable instructions, when executed on a computer system, causing the computer system to perform the operations comprising:
   building at least one stochastic model for determining a probability of a state transition between possible states for each of a plurality of components in a system;
   receiving output data from the system, at least some of the output data being relevant to state transitions for at least some of the plurality of components in the system;
   training each stochastic model for the plurality of components in a system with output data that is relevant for a respective component;
   determining a states of the plurality of components in the system from the at least one stochastic model; and
   determining a state of the system from a distribution of the states for the plurality of components among the possible states.

3. A computer hardware system for using stochastic models to assess component state information comprising:
   a plurality of components;
   a plurality of servers to run the plurality of components and to generate output data;
   a monitoring engine to receive the output data, at least some of the output data being relevant to state transitions for at least some of the plurality of components;
   a stochastic engine to build at least one stochastic model for determining a probability of a state transition between possible states for each of the plurality of components, to train each of the at least one stochastic model stochastic model for the plurality of components with output data that is relevant for a respective component and with the action response output data, and to determine states of the plurality of components from the at least one stochastic model; and
   a matrix engine to receive a plurality of actions for a component and to receive action response output data from the system in response to the component processing the plurality of actions and pass the action response output data to the stochastic engine, to determine probabilities of state transitions between possible states of the component from each stochastic model for the plurality of components for each of the plurality of actions from the action response output data, and to correlate the probabilities of state transitions between the possible states of the plurality of components with the current state of the plurality of components and a particular action, for each of the plurality of actions.

4. The method recited in claim 1, wherein building at least one stochastic model for determining a probability of a state transition between possible states for each of a plurality of components in a system further comprises:
   determining a plurality of internal states for each of the plurality of components in the system;

determining relevant output data for each of the plurality of components, said relevant output data to be generated by the system at runtime;

creating at least one initial stochastic model for each of the plurality of components in the system;

obtaining training data for the at least one initial stochastic model for each of the plurality of components, said training data comprising relevant output data for each of the plurality of components; and training each of the at least one initial stochastic model for each of the plurality of components with the training data.

5. The method recited in claim 1, further comprising:

receiving a plurality of actions for a component;

receiving action response output data from the system in response to the component processing the plurality of actions;

training a stochastic model for the component with the action response output data;

determining probabilities of a state transition between possible states of the component from the stochastic model for each of the plurality of actions from the action response output data;

correlating the probabilities of a state transition between possible states of the component with the current state of the component and an action, for each of the plurality of actions; and storing the probability correlations.

6. The method recited in claim 1, further comprising:

receiving a plurality of actions for the plurality of components;

receiving action response output data from the system in response to the plurality of components processing the plurality of actions;

training each stochastic model for the plurality of components in the system with action response output data;

determining probabilities of state transitions between possible states of the component from each stochastic model for the plurality of components for each of the plurality of actions from the action response output data;

correlating the probabilities of state transitions between the possible states of the plurality of components with the current state of the plurality of components and an action, for each of the plurality of actions; and storing the probability correlations.

7. The method recited in claim 6, further comprising:

receiving a request for an action by a component running in the system;

assessing a current state of the component from a stochastic model for determining a probability of a state transition between possible states for the component; and determining a probability of a state transition between the possible states of the component for the current state of the component and the requested action.

8. The method recited in claim 7, further comprising:

assessing a high probability of a transition to a worsening state for the component; and invoking a preventative measure.

9. The method recited in claim 8, wherein the preventative measure comprises canceling the requested action.

10. The method recited in claim 8, wherein the preventative measure comprises notifying an operator.

11. The method recited in claim 1, further comprising:

receiving a component failure indication;

uncovering a path of state transitions from a stochastic model, said state transitions occurring at discrete times prior to the component failure; and analyzing the path of state transitions for a cause to the component failure.

12. The method recited in claim 1, further comprising:

receiving a component failure indication;

uncovering a plurality of paths of state transitions from the at least one stochastic model for each of the plurality of components in the system, said state transitions occurring at discrete times prior to the component; and analyzing the plurality of paths of state transitions for a correlations between state transitions of the plurality of components the component failure.

13. The computer usable tangible medium recited in claim 2, wherein building at least one stochastic model for determining a probability of a state transition between possible states for each of a plurality of components in a system further comprises:

determining a plurality of internal states for each of the plurality of components in the system;

determining relevant output data for each of the plurality of components, said relevant output data to be generated by the system at runtime;

building at least one initial stochastic model for each of the plurality of components in the system;

obtaining training data for the at least one initial stochastic model for each of the plurality of components, said training data comprising relevant output data for each of the plurality of components; and training each of the at least one initial stochastic model for each of the plurality of components with the training data.

14. The computer usable tangible medium recited in claim 2, comprising:

receiving a plurality of actions for a component;

receiving action response output data from the system in response to the component processing the plurality of actions;

training a stochastic model for the component with the action response output data;

determining probabilities of a state transition between possible states of the component from the stochastic model for each of the plurality of actions from the action response output data;

correlating the probabilities of a state transition between possible states of the component with the current state of the component and an action, for each of the plurality of actions; and storing the probability correlations.

15. The computer usable tangible medium recited in claim 2, further comprising:

receiving a plurality of actions for the plurality of components;

receiving action response output data from the system in response to the plurality of components processing the plurality of actions;

training each stochastic model for the plurality of components in the system with action response output data;

determining probabilities of state transitions between possible states of the component from each stochastic model for the plurality of components for each of the plurality of actions from the action response output data;

correlating the probabilities of state transitions between the possible states of the plurality of components with the current state of the plurality of components and an action, for each of the plurality of actions; and storing the probability correlations.

16. The computer usable tangible medium recited in claim 15, further comprising:

receiving a request for an action by a component running in the system;

assessing a current state of the component from a stochastic model for determining a probability of a state transition between possible states for the component; and determining a probability of a state transition between the possible states of the component for the current state of the component and the requested action.

17. The computer usable tangible medium recited in claim 16, further comprising:

assessing a high probability of a transition to a worsening state for the component; and invoking a preventative measure.

18. The computer usable tangible medium recited in claim 17, wherein the preventative measure comprises canceling the requested action.

19. The computer usable tangible medium recited in claim 17, wherein the preventative measure comprises notifying an operator.

20. The computer usable tangible medium recited in claim 2, further comprising:

receiving a component failure indication;

uncovering a plurality of paths of state transitions from the at least one stochastic model for each of the plurality of components in the system, said state transitions occurring at discrete times prior to the component; and analyzing the plurality of paths of state transitions for a correlations between state transitions of the plurality of components the component failure.

* * * * *